(12) United States Patent
Toki

(10) Patent No.: US 10,754,153 B2
(45) Date of Patent: Aug. 25, 2020

(54) VEHICLE DISPLAY APPARATUS

(71) Applicant: DENSO CORPORATION, Kariya, Aich-pref. (JP)

(72) Inventor: Kimihiro Toki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/513,989

(22) Filed: Jul. 17, 2019

(65) Prior Publication Data

US 2019/0339519 A1 Nov. 7, 2019

Related U.S. Application Data

(63) Continuation of application No. PCT/JP2017/046322, filed on Dec. 25, 2017.

(30) Foreign Application Priority Data

Jan. 24, 2017 (JP) .................................. 2017-010423

(51) Int. Cl.
*G09G 5/00* (2006.01)
*G02B 27/01* (2006.01)
(Continued)

(52) U.S. Cl.
CPC .......... *G02B 27/0101* (2013.01); *B60K 35/00* (2013.01); *G09G 5/10* (2013.01);
(Continued)

(58) Field of Classification Search
CPC ................ G02B 27/01; G02B 27/0101; G02B 2027/0118; G09G 5/10; G09G 5/38;
(Continued)

(56) References Cited

U.S. PATENT DOCUMENTS 7,815,313 B2 * 10/2010 Ito .......................... G08G 1/167
340/425.5
8,681,136 B2 * 3/2014 Kubota .................... G09G 5/10
345/207

(Continued)

FOREIGN PATENT DOCUMENTS

JP H07132758 A 5/1995
JP 2010149734 A 7/2010
(Continued)

*Primary Examiner* — Joe H Cheng
(74) *Attorney, Agent, or Firm* — Harness, Dickey & Pierce, P.L.C.

(57) ABSTRACT

A vehicle display apparatus includes an HUD that projects a display image formed at a first conjugate position to a projection member so as to place the display image as a virtual image at a second conjugate position. The first conjugate position is conjugate to a viewing region inside a vehicle through the projection member, and the second conjugate position is conjugate with an external sensor through the projection member. An HCU increases display luminance of a selected image selected from the display image to a fail-safe luminance by controlling a virtual image display state of the display image when a fail condition is met. The fail condition is that the current brightness detected by the external sensor exceeds an upper limit of an allowable range.

10 Claims, 14 Drawing Sheets

(51) Int. Cl.
*B60K 35/00* (2006.01)
*G09G 5/10* (2006.01)
*G09G 5/38* (2006.01)

(52) U.S. Cl.
CPC .......... *G09G 5/38* (2013.01); *B60K 2370/155* (2019.05); *B60K 2370/1529* (2019.05); *B60K 2370/31* (2019.05); *B60K 2370/334* (2019.05); *B60K 2370/349* (2019.05); *G02B 2027/0118* (2013.01); *G09G 2354/00* (2013.01)

(58) Field of Classification Search
CPC ................ G09G 2354/00; B60K 35/00; B60K 2370/155; B60K 2370/31; B60K 2370/334; B60K 2370/349
See application file for complete search history.

(56) References Cited

U.S. PATENT DOCUMENTS

| | | | | |
|---|---|---|---|---|
| 2002/0067366 A1* | 6/2002 | Hirao | .................... | B60K 35/00 345/660 |
| 2007/0146302 A1* | 6/2007 | Liu | .......................... | G09G 5/10 345/102 |
| 2016/0159280 A1* | 6/2016 | Takazawa | .............. | B60K 37/00 345/8 |
| 2016/0170487 A1* | 6/2016 | Saisho | .................... | B60K 35/00 345/156 |
| 2016/0247321 A1* | 8/2016 | Wong | ...................... | G06F 3/147 |
| 2016/0313562 A1* | 10/2016 | Saisho | ............... | G02B 27/0179 |
| 2017/0004805 A1* | 1/2017 | Irzyk | ........................ | G09G 5/10 |
| 2017/0232884 A1* | 8/2017 | Watase | ..................... | G09G 5/10 315/82 |
| 2018/0017791 A1* | 1/2018 | Beckman | ........... | G02B 27/0103 |
| 2018/0118099 A1* | 5/2018 | Kunii | ................... | H04N 9/3179 |
| 2018/0373027 A1* | 12/2018 | Higuchi | ............. | G02B 27/0101 |
| 2019/0061529 A1* | 2/2019 | Saisho | .................... | B60K 35/00 |
| 2019/0126824 A1* | 5/2019 | Oba | ..................... | G02B 27/0101 |
| 2019/0217780 A1* | 7/2019 | Yamaguchi | .............. | B60R 11/04 |
| 2019/0369394 A1* | 12/2019 | Naruse | ............. | G02B 27/0101 |
| 2019/0381885 A1* | 12/2019 | Naruse | ..................... | G09G 5/10 |
| 2019/0384060 A1* | 12/2019 | Naruse | ..................... | G09G 5/10 |

FOREIGN PATENT DOCUMENTS

| | | |
|---|---|---|
| JP | 2011093413 A | 5/2011 |
| JP | 2014024492 A | 2/2014 |
| JP | 2015178297 A | 10/2015 |

* cited by examiner

VEHICLE DISPLAY APPARATUS

CROSS REFERENCE TO RELATED APPLICATIONS

The present application is a continuation application of International Patent Application No. PCT/JP2017/046322 filed on Dec. 25, 2017, which designated the United States and claims the benefit of priority from Japanese Patent Application No. 2017-010423 filed on Jan. 24, 2017. The entire disclosures of all of the above applications are incorporated herein by reference.

TECHNICAL FIELD

The present disclosure relates to a vehicle display apparatus.

BACKGROUND

Vehicle display apparatuses that form and produce a display image to be projected onto a projection member, through which an outside view is visible in a vehicle, with a head-up display (HUD), have widely been known.

SUMMARY

According to at least one embodiment of the present disclosure, a vehicle display apparatus displays a display image as a virtual image visible from a viewing region inside a vehicle. The vehicle display apparatus includes an external sensor, a projection member, a head-up display and a display control unit. The external sensor detects brightness of an outside view of the vehicle. The projection member is transparent to light from the outside view. The head-up display projects the display image formed at a first conjugate position to the projection member so as to place the virtual image at a second conjugate position. The first conjugate position is conjugate to the viewing region through the projection member, and the second conjugate position is conjugate to the external sensor through the projection member. The display control unit increases display luminance of a selected image selected from the display image to a fail-safe luminance by controlling a virtual image display state of the display image when a fail condition is met. The fail condition is that the brightness detected by the external sensor exceeds an upper limit of an allowable range.

DETAILED DESCRIPTION

Figure 1:
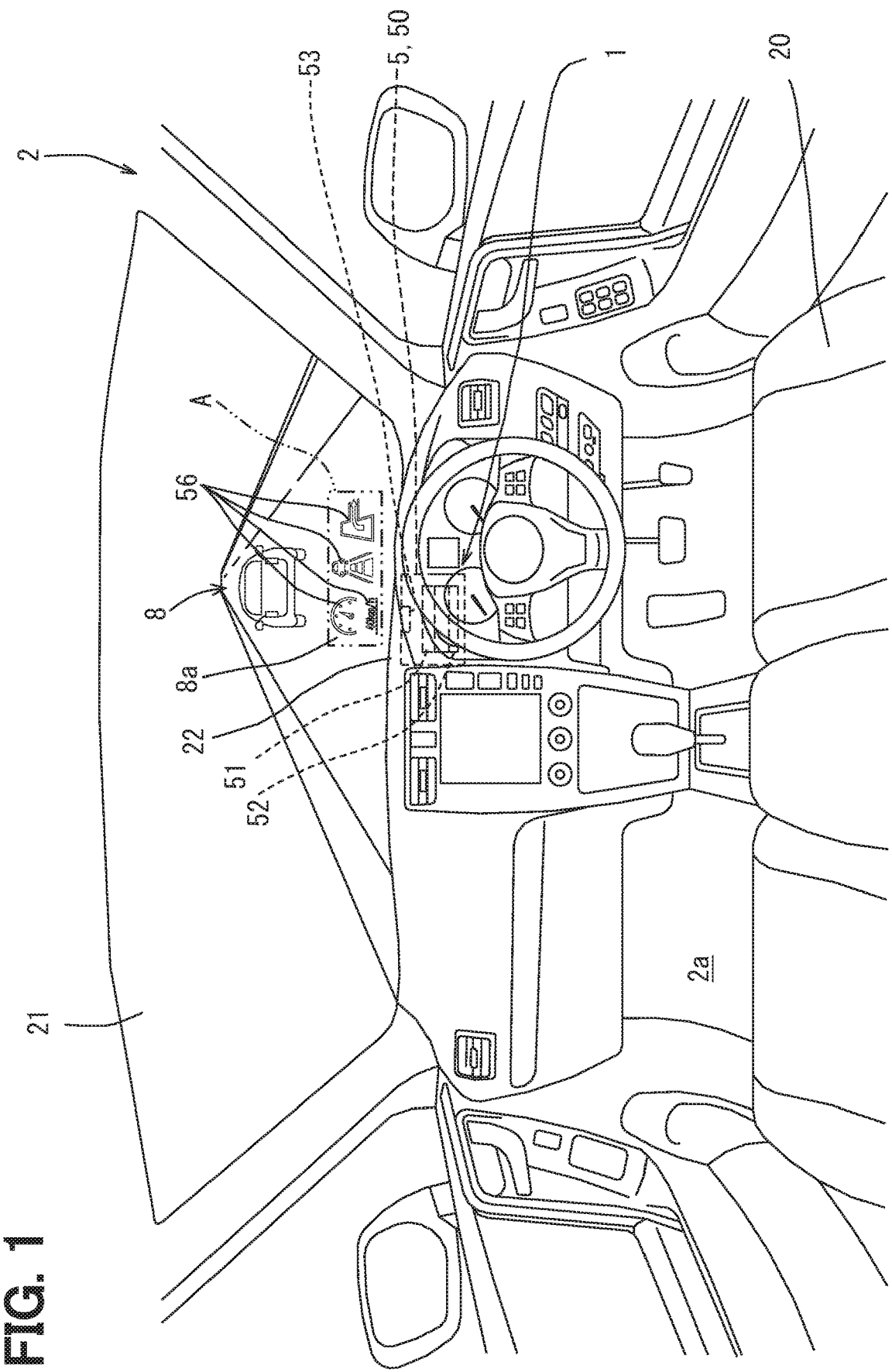
FIG. 1 is an internal view of a vehicle interior of a vehicle equipped with a vehicle display apparatus according to at least one embodiment.

In a vehicle display apparatus of a comparative example, display colors of display images are adjusted by controlling a display status of virtual images in accordance with the background color of a front view that is the outside view. More specifically, when a complementary color of the background color is not a warning color, the display color is adjusted to this complementary color.

In this apparatus, the display color is adjusted to the complementary color of the background color depending on the background color. With this method of adjustment, when the brightness of the outside view is extremely high, for example, because the vehicle is driving on a snowy road the image displayed as a virtual image simply with the complementary color of the background color may have insufficient contrast of the display luminance relative to the outside view, resulting in poorer visibility.

The present disclosure provides a vehicle display apparatus that can ensure the visibility of display images.

According to one aspect of the present disclosure, a vehicle display apparatus displays a display image as a virtual image visible from a viewing region inside a vehicle. The vehicle display apparatus includes an external sensor, a projection member, a head-up display and a display control unit. The external sensor detects brightness of an outside view of the vehicle. The projection member is transparent to light from the outside view. The head-up display projects the display image formed at a first conjugate position to the projection member so as to place the virtual image at a second conjugate position. The first conjugate position is conjugate to the viewing region through the projection member, and the second conjugate position is conjugate to the external sensor through the projection member. The display control unit increases display luminance of a selected image selected from the display image to a fail-safe luminance by controlling a virtual image display state of the display image when a fail condition is met. The fail condition is met when the brightness detected by the external sensor exceeds an upper limit of an allowable range.

According to this aspect, the displayed image formed at the first conjugate position is produced as the virtual image at the second conjugate position by the head-up display. In this way, the brightness of the outside view is detected in a background portion of the displayed image at the second conjugate position. Thus, it can be precisely determined whether the fail condition indicating a lack of contrast of the displayed image relative to the outside view is met. Therefore, the display luminance of the image selected as the displayed image can be increased to as high as the fail-safe luminance, specifically in situations where the contrast may be insufficient because of the brightness of the outside view exceeding the upper limit of the tolerable range. As a result, the visibility of the selected images can be ensured.

Hereinafter, various embodiments of the present disclosure will be described with reference to the drawings. Equivalent elements in various embodiments may be given the same reference numerals thereby to omit repetitive description. When only some parts of a configuration are described in each embodiment, the description of the configuration of other previously described embodiments may be applied to other features of the configuration. In addition to the combinations of configurations as indicated in the description of various embodiments, the configurations of various embodiments can be partly combined even if not explicitly suggested, unless such combinations are contradictory.

First Embodiment

Figure 2:
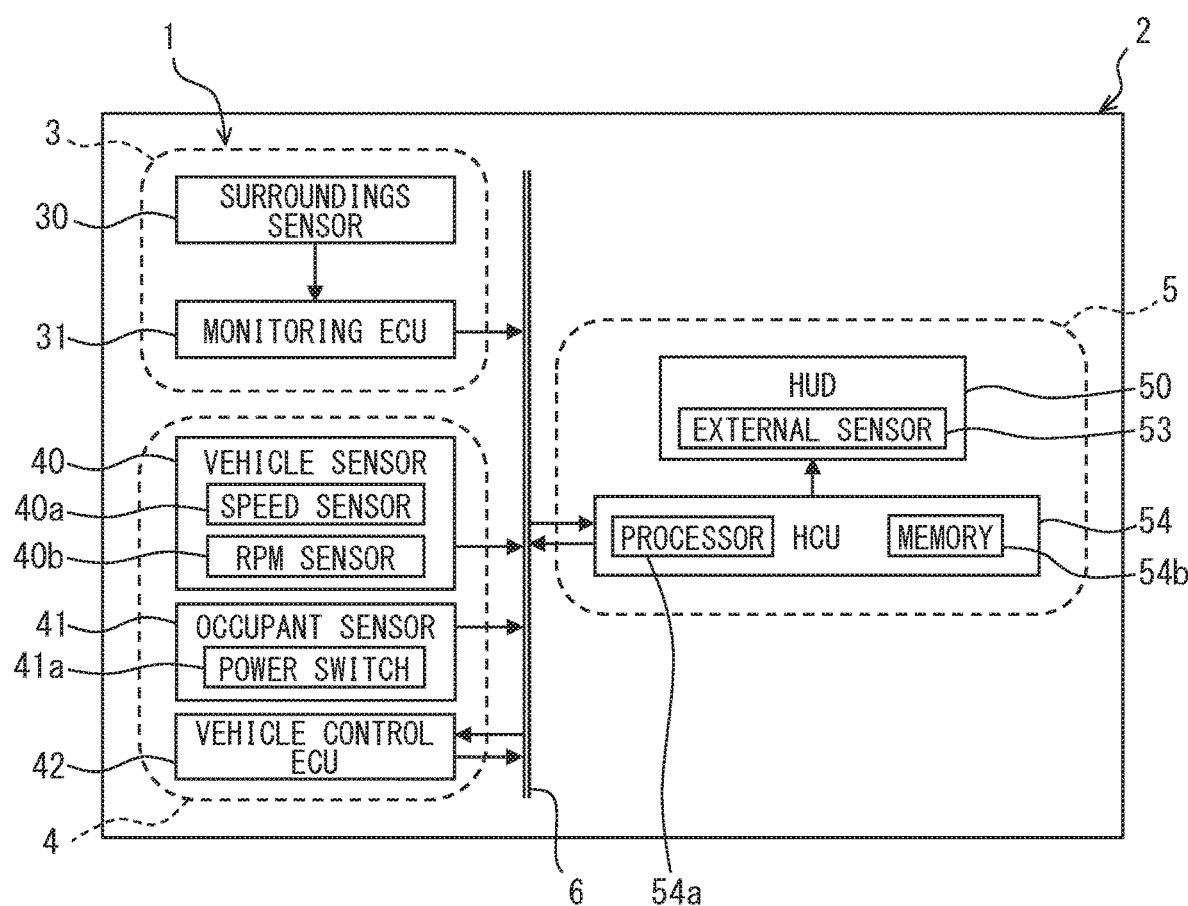
FIG. 2 is a block diagram showing a vehicle display apparatus according to at least one embodiment.

A driver assist system 1 according to a first embodiment of the present disclosure is mounted on a vehicle 2 as shown in FIG. 1 and FIG. 2. The driver assist system 1 is configured to include a surroundings monitoring system 3, a vehicle control system 4, and a vehicle display apparatus 5. These units 3, 4, and 5 are interconnected via an in-vehicle network 6 such as a LAN (Local Area Network).

The surroundings monitoring system 3 includes a surroundings sensor 30 and a surroundings monitoring ECU (Electronic Control Unit) 31 as shown in FIG. 2.

The surroundings sensor 30 detects outside obstacles such as other vehicles, artificial structures, humans, animals, and so on that the vehicle 2 may collide, as well as traffic signs and the like such as speed signs and various warning signs present outside the vehicle 2 (i.e., outside the vehicle interior 2a), for example. The surroundings sensor 30 is one or a plurality of types of sonars, radars, LIDAR (Light Detection and Ranging/Laser Imaging Detection and Ranging), cameras, and the like.

The surroundings monitoring ECU 31 is mainly composed of a microcomputer including a processor and a memory, and connected to the surroundings sensor 30 and in-vehicle network 6. The surroundings monitoring ECU 31 acquires obstacle information, traffic signs information, and the like, for example, based on output signals of the surroundings sensor 30.

The vehicle control system 4 includes a vehicle-related sensor 40 (vehicle condition sensor), an occupant-related sensor 41, and a vehicle control ECU 42. The vehicle-related sensor 40 is connected to the in-vehicle network 6. The vehicle-related sensor 40 acquires, for example, driving condition information of the vehicle 2, navigation information, traffic signs information, driving environment information, and the like. The vehicle-related sensor 40 is a plurality of types of a vehicle speed sensor 40a, an rpm sensor 40b, a steering angle sensor, a fuel sensor, a water temperature sensor, a communication device, and the like, for example, and includes at least the vehicle speed sensor 40a and the rpm sensor 40b.

The occupant-related sensor 41 is connected to the in-vehicle network 6. The occupant-related sensor 41 detects the conditions of, or operations performed by an occupant aboard the vehicle 2 in the vehicle interior 2a. The occupant-related sensor 41 is one or a plurality of types of a power switch 41a, display setting switches, an occupant condition monitor, turn switches, and the like, for example, and includes at least the power switch 41a.

The power switch 41a detects an operation by the occupant performed inside or outside the vehicle interior 2a to start up the internal combustion engine or motor generator of the vehicle 2. For the power switch 41a, one or a plurality of types of a rotary switch and a push switch manually operated by the occupant, and a remote control with an electronic key, for example, are adopted.

The vehicle control ECU 42 is mainly composed of a microcomputer including a processor and a memory, and connected to the in-vehicle network 6. The vehicle control ECU 42 is one or a plurality of types of an engine control ECU, a motor control ECU, a brake control ECU, a steering control ECU, an integrated control ECU, and the like, which enable automatic control of the vehicle 2.

The vehicle display apparatus 5 includes an HUD 50 and an HCU (HMI (Human Machine Interface) Control Unit) 54 as shown in FIG. 2 for displaying virtual images of display images 56 in the vehicle interior 2a.

Figure 3:
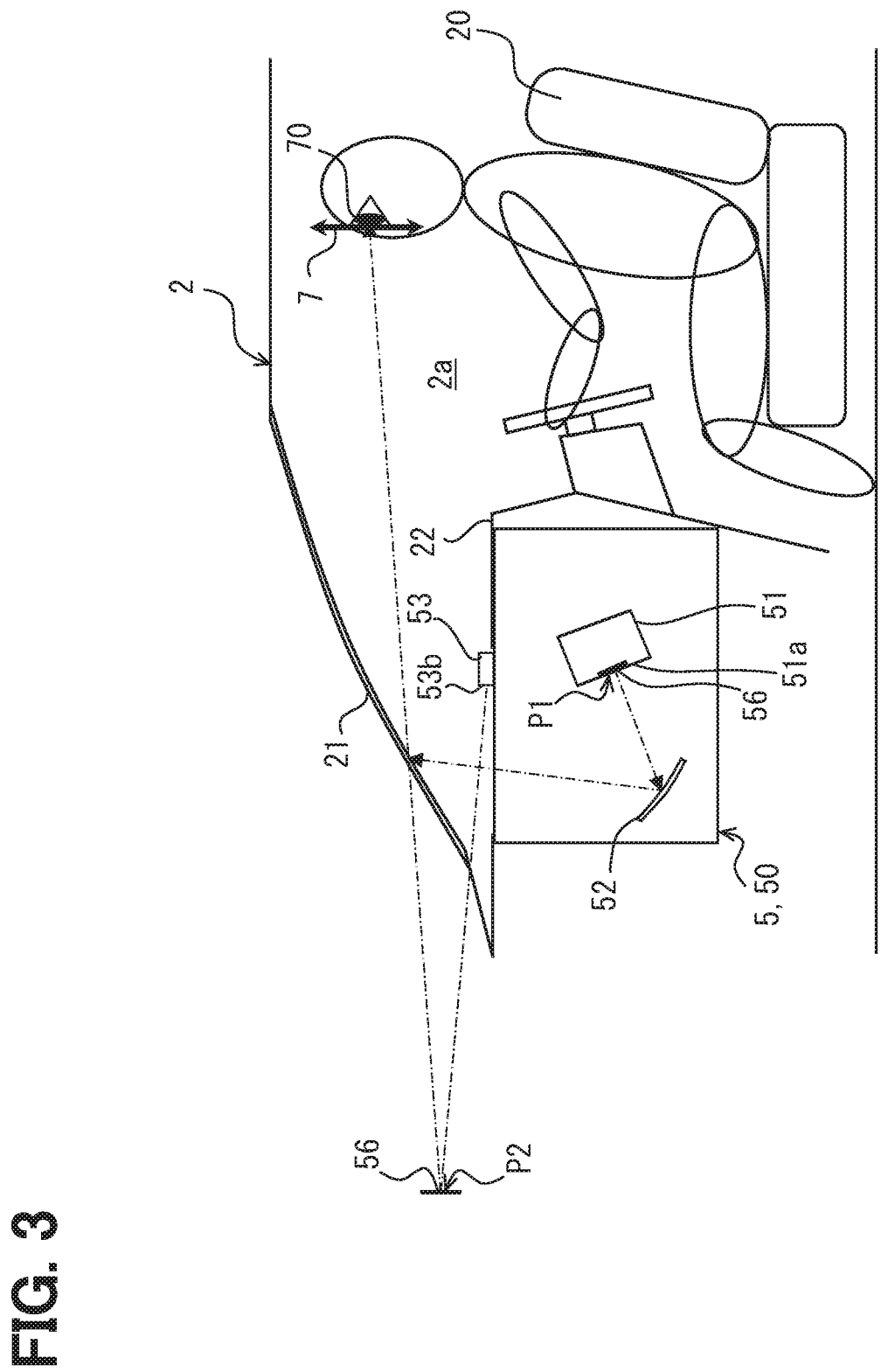
FIG. 3 is a block diagram showing a configuration of an HUD according to at least one embodiment.
Figure 4:
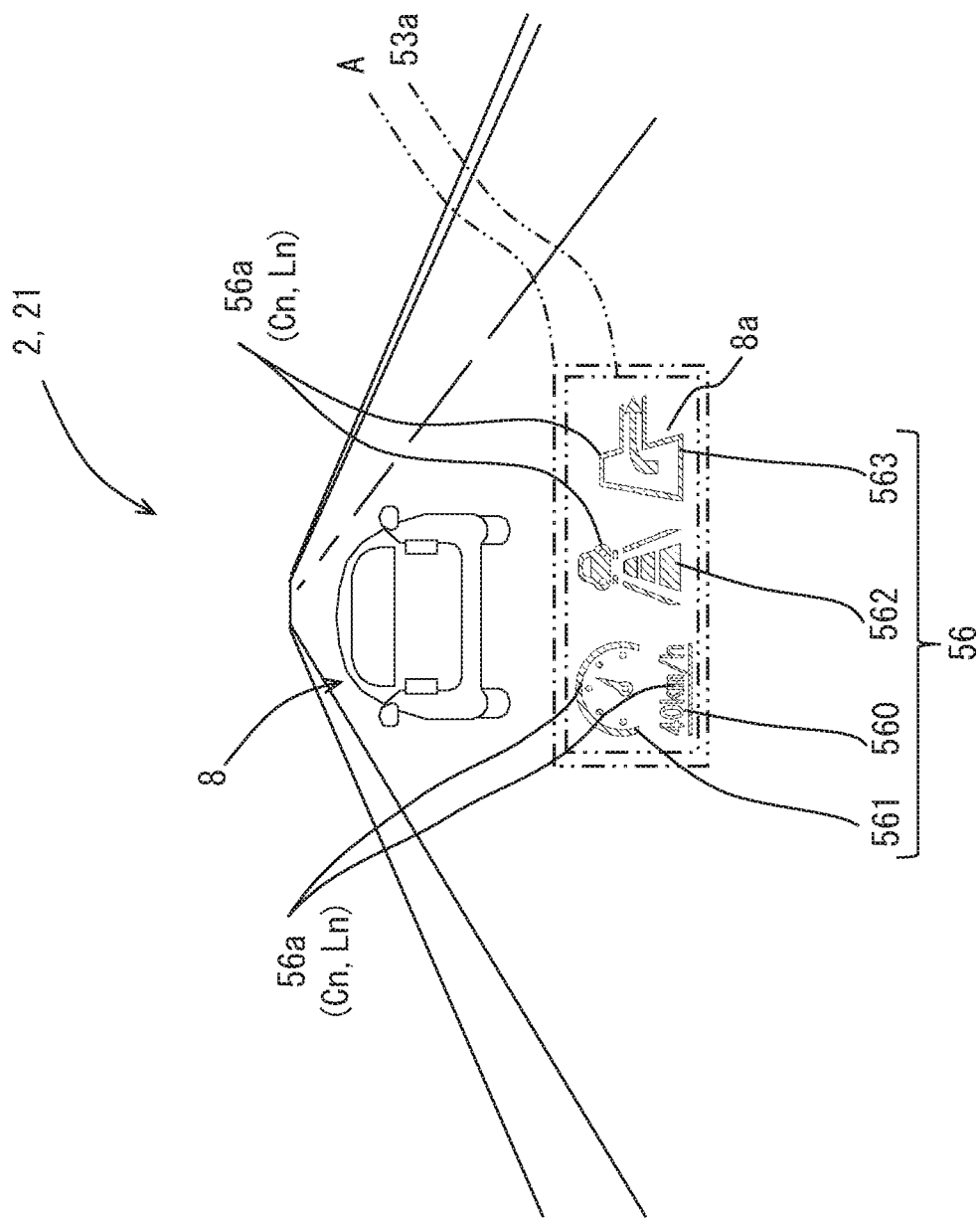
FIG. 4 is a front view showing how a display image is presented as a virtual image according to at least one embodiment.
Figure 5:
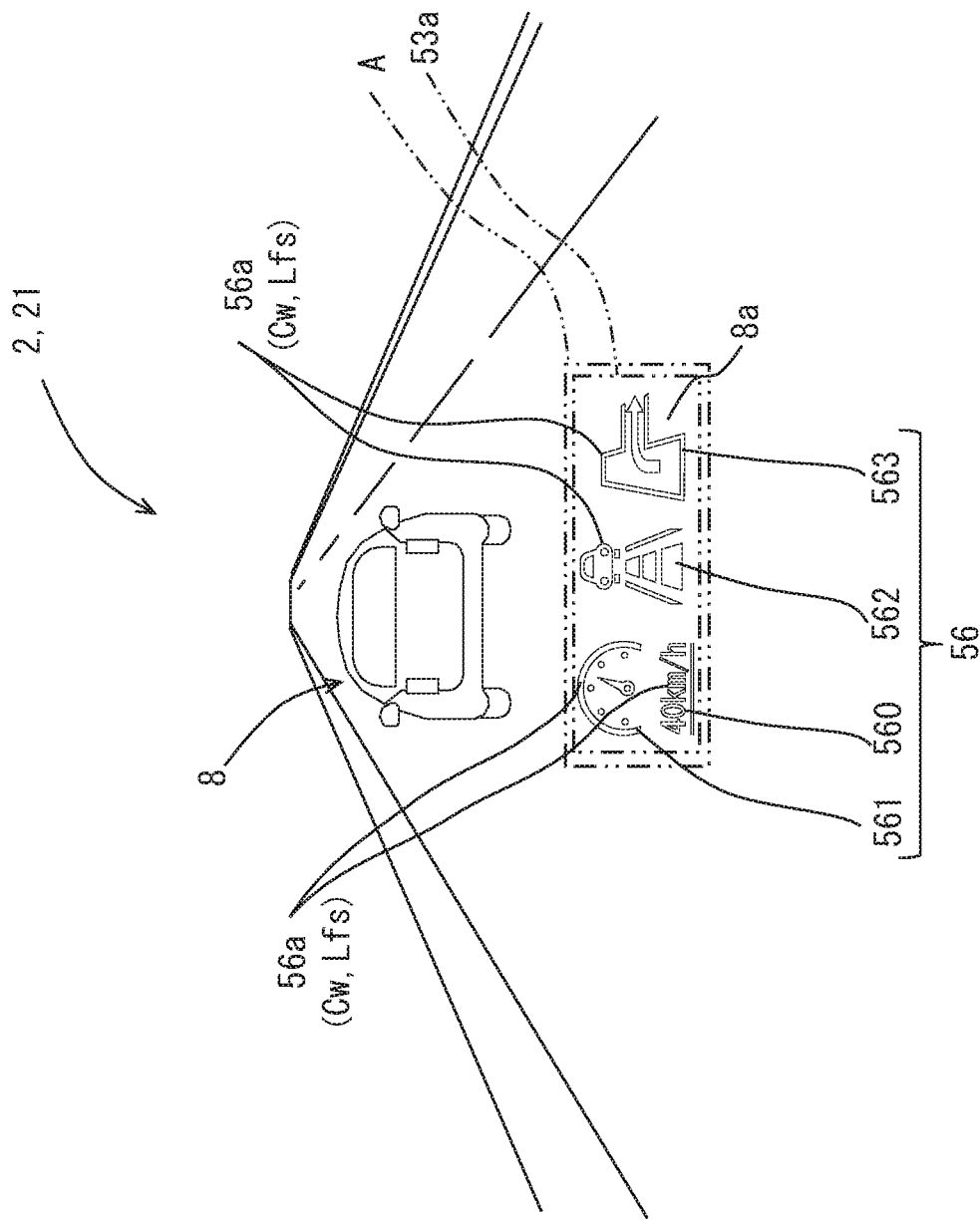
FIG. 5 is a front view showing how a display image is presented as a virtual image according to at least one embodiment.

The HUD 50 is installed in an instrument panel 22 in the vehicle interior 2a, as shown in FIG. 1 and FIG. 3. The HUD 50 forms a display image 56 in color on an image forming surface 51a that is a viewing surface or screen by a liquid crystal or laser scanner projector 51. The display image 56 includes at least a vehicle speed image 560, an rpm image 561, an automatic control image 562, and a navigation image 563, as shown in FIG. 4 and FIG. 5.

The vehicle speed image 560 indicates the vehicle speed information based on the output signal from the vehicle speed sensor 40a. The rpm image 561 indicates the engine rpm information based on the output signal from the rpm sensor 40b. The automatic control image 562 indicates operating information of an adaptive cruise control (ACC) system that automatically controls the vehicle speed of the vehicle 2 and a distance from vehicles ahead, and operating information of a lane keeping assist (LKA) system that automatically controls the position of the vehicle 2 in the widthwise direction of a driving lane. The navigation image 563 indicates navigation information for guidance of a planned driving route of the vehicle 2. In addition to the above, the display image 56 may include an image or images, for example, of one or a plurality of traffic signs information, weather information, road surface information, music information, movie information, mobile communication information, and the like.

The display colors of the display image 56 can be adjusted through setting of, for example, respective color gradients in a liquid crystal projector 51, or the laser intensities or the like of light sources for respective colors of a laser projector 51. The display luminance of the display image 56 can be adjusted through setting of, for example, at least one of the gradients of respective colors or the luminance of light sources of a liquid crystal projector 51, or the laser intensities or the like of light sources for respective colors of a laser projector 51. The display color and display luminance of the display image 56 presented as outlined shapes in the example shown in FIG. 5 are adjusted to white color Cw and fail-safe luminance Lfs, respectively. On the other hand, the display color and display luminance of the display image 56 presented as shapes with right-up diagonal strokes in the example shown in FIG. 4 are adjusted to normal color Cn other than white color Cw and normal luminance Ln lower than the fail-safe luminance Lfs, respectively.

Thus, the display image 56 formed by the projector 51 is projected onto a front windshield 21 of the vehicle 2 via an optical system 52 with a concave mirror or the like, as shown in FIG. 1 and FIG. 3. Since the front windshield 21 is made of transparent glass, an outside view 8, which is a view present in front of the vehicle interior 2a outside the vehicle 2, shows through as shown in FIG. 1. As a result, the light rays from the display image 56 reflected by the front windshield 21, and the light rays from the outside view 8 through the shield 21 are both perceived by the occupant on the driver's seat 20 in the vehicle interior 2a. Thus, the virtual image of the display image 56 produced in front of the front windshield 21 is shown in a display area A overlapping with part of the outside view 8 as shown in FIG. 1, FIG. 4, and FIG. 5, so that the occupant on the driver's seat 20 can see it in the viewing region 7 as shown in FIG. 3.

The image forming surface 51a on which the display image 56 is formed in the projector 51 is disposed at a first conjugate position P1 which is conjugate to the viewing region 7 through the front windshield 21 that corresponds to the "projection member" in the first embodiment. This enables the display image 56 to appear as a virtual image when the eye point 70 of the occupant is positioned within the viewing region 7 in the vehicle interior 2a.

The HUD 50 configured as described above is installed in the vehicle 2, with an additional external sensor 53 as shown in FIG. 1 to FIG. 3. The external sensor 53 is configured with photo transistors or photo diodes, and the like, for example. As shown in FIG. 3, the external sensor 53 has a detection area 53a (see FIG. 4 or FIG. 5, for example) in the outside view 8 spaced a preset distance from its own detection surface 53b in front of the vehicle interior 2a. Thus, the external sensor 53 detects the illuminance or luminance of the detection area 53a outside the vehicle interior 2a as the brightness of the outside view 8.

The position where the display image 56 is produced from the image forming surface 51a of the projector 51 is set at a second conjugate position P2 which is conjugate to the detection surface 53b of the external sensor 53 through the front windshield 21 that corresponds to the "projection member" in the first embodiment. Moreover, the display area A shown as a virtual image as shown in FIG. 4 and FIG. 5 as a result of the display image 56 being produced at the second conjugate position P2 is adjusted such as to include the entire detection area 53a, which is the region where the external sensor 53 detects brightness.

The HCU 54 is mainly composed of a microcomputer including a processor 54a and a memory 54b as shown in FIG. 2, and connected to the HUD 50 and in-vehicle network 6. The HCU 54 controls virtual image display of the display image 56 produced by the HUD 50. The HCU 54 executes display control based on information acquired or detected by the ECUs 31 and 42 and sensors 40 and 41, for example, and information and the like stored in the memory 54b. The memory 54b of the HCU 54 and memories of various other ECUs are each configured using one or a plurality of recording media such as semiconductors memories, magnetic media or optical media, for example.

The HCU 54 servers the function of a "display control unit" here, wherein it reads out the image to be displayed 56 that is previously stored in the memory 54b and controls the state of the virtual image of the image 56 displayed by the HUD 50. More specifically, the HCU 54 executes a display control program previously stored in the memory 54b by the processor 54a to realize, functionally, each step of the display control flow shown in FIG. 6. This display control flow starts in response to a turn-on operation of the power switch 41a, and ends with a turn-off operation of the switch 41a. "S" in the display control flow represents each step. The display image 56, whose virtual image state is controlled by the display control flow, may also be realized by the HUD 50 shown in FIG. 2, or a memory integrated in another display element of the vehicle 2, or a combination of this integrated memory and the memory 54b.

Figure 6:
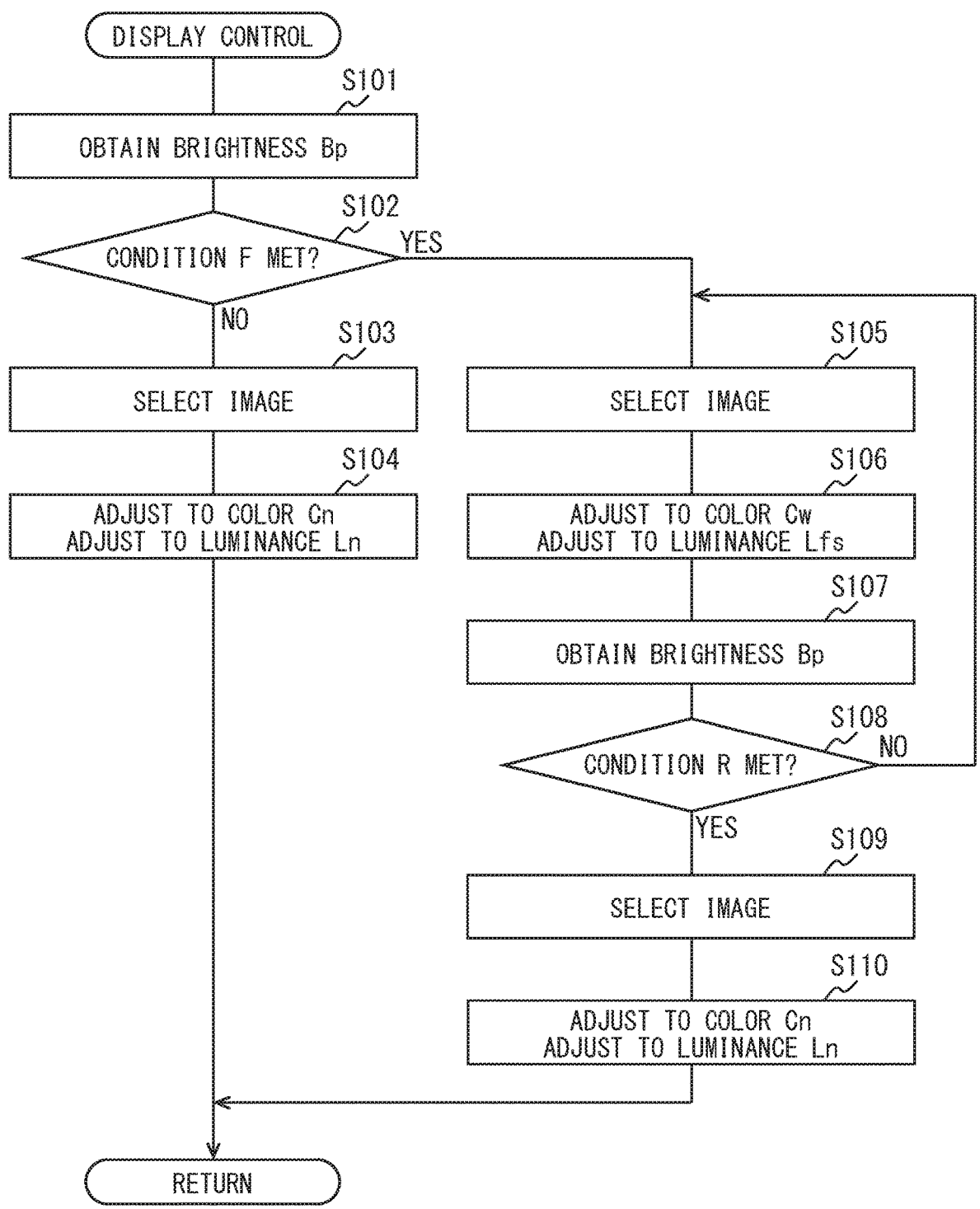
FIG. 6 is a flowchart showing a display control flow according to at least one embodiment.
Figure 7:
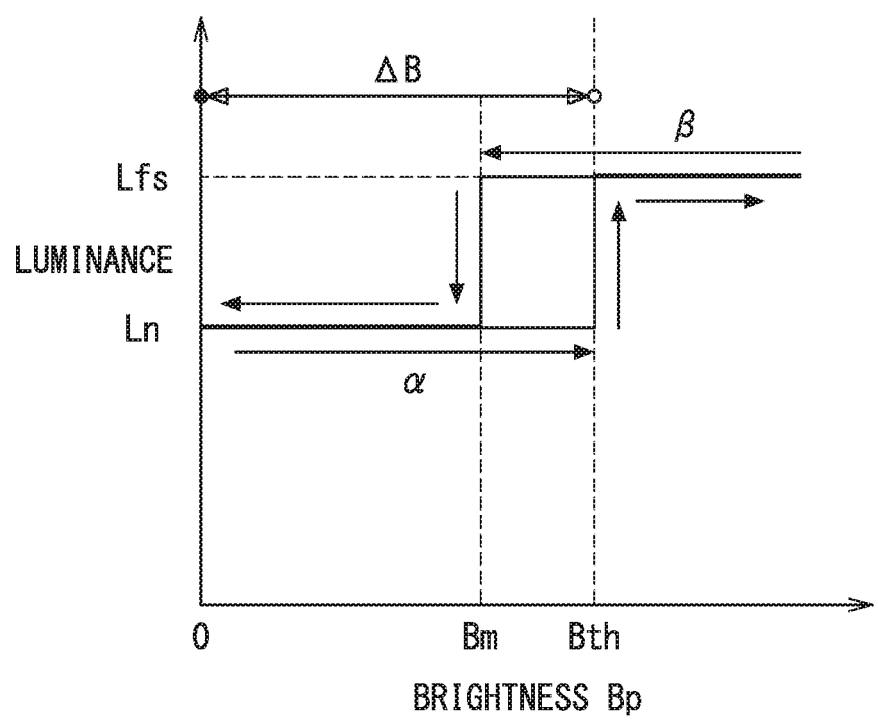
FIG. 7 is a graph for explaining a display control according to at least one embodiment.

At S101 of the display control flow, as shown in FIG. 6, the brightness of the outside view 8 detected by the external sensor 53 is obtained as current brightness Bp. At S102 that follows, it is determined whether or not a fail condition F has been met, which is that the current brightness Bp obtained at S101 exceeds the upper limit of an allowable range ΔB. The allowable range ΔB here is set to the range of 0 or more and below a minimum brightness Bth (e.g., a luminance of 20000 cd/m²), as shown in FIG. 7. The minimum brightness Bth here means the brightness of the outside view 8 with which the contrast of the display image 56 is expected to be insufficient if the display luminance of the display image 56 is a normal luminance Ln (e.g., 600 to 10000 cd/m²). Therefore, when the fail condition F is met, it means that the current brightness Bp exceeds the upper limit of the allowable range ΔB as indicated with arrow α in FIG. 7 and is not lower than the minimum brightness Bth.

If the answer at S102 is negative, i.e., if the fail condition F is not met, the process goes to S103 as shown in FIG. 6. At S103, a vehicle speed image 560, an rpm image 561, an automatic control image 562, and a navigation image 563, which are at least included in the display image 56, are selected as selected images 56a, as shown in FIG. 4. At S104 that follows, the display color of the selected images 56a selected at S103 is adjusted to normal color Cn as shown in FIG. 4 and FIG. 7, and the display luminance is adjusted to normal luminance Ln. The normal luminance Ln here is adjusted to either a fixed or variable value within a range lower than the fail-safe luminance Lfs. After performing S104, the process goes back to S101 as shown in FIG. 6.

If, on the other hand, the answer at S102 is affirmative, i.e., if the fail condition F is met, the process goes to S105. At S105, a vehicle speed image 560, an rpm image 561, an automatic control image 562, and a navigation image 563, which are at least included in the display image 56, are selected as selected images 56a, as shown in FIG. 5. At S106 that follows, the display color of the selected images 56a selected at S105 is adjusted to white color Cw as shown in FIG. 5 and FIG. 7, and the display luminance is adjusted to fail-safe luminance Lfs. The fail-safe luminance Lfs here is higher than the normal luminance Ln, and fixed to a maximum luminance (e.g., of 13000 cd/m²) in particular as preset in the HUD 50. Thus, at S106, the display luminance is increased to as high as the fail-safe luminance Lfs that is the maximum luminance, with the display color being forcibly adjusted to white color Cw.

At S107 in FIG. 6 to which the process goes after S106 is performed as described above, the brightness of the outside view 8 detected by the external sensor 53 is obtained as current brightness Bp. At S108 that follows, it is determined whether or not a return condition R has been met, which is that the current brightness Bp obtained at S107 falls back into the allowable range ΔB after the fail condition F has been met. Here, falling back into the allowable range ΔB as shown in FIG. 7 is defined as a decline of the current brightness Bp to as low as an intermediate brightness Bm or lower that is on the darker side than the minimum brightness Bth mentioned above. Therefore, when the return condition R is met, it means not only that the current brightness Bp goes down to below the minimum brightness Bth and falls back into the allowable range ΔB after the fail condition F has been met, but also that the current brightness Bp goes further down as shown by arrow β in FIG. 7 and reaches the intermediate brightness Bm.

If the answer at S108 is negative, i.e., if the return condition R is not met, the process goes back to S105 as shown in FIG. 6. On the other hand, if the answer at S108 is affirmative, i.e., if the return condition R is met, the process goes to S109. At S109, a vehicle speed image 560, an rpm image 561, an automatic control image 562, and a navigation image 563, which are at least included in the display image 56, are selected as selected images 56a, as shown in FIG. 4. At S110 that follows, the display color of the selected images 56a selected at S109 is adjusted to normal color Cn as shown in FIG. 4 and FIG. 7, and the display luminance is adjusted to normal luminance Ln. In this way, the display color and the display luminance are adjusted back to the normal color Cn and the normal luminance Ln, respectively. After performing S110, the process goes back to S101 as shown in FIG. 6.

(Effects)

The effects of the first embodiment described above will be explained below.

According to the first embodiment, the display image 56 formed by the HUD 50 at the first conjugate position P1, which is conjugate to the viewing region 7 through the front windshield 21, is produced as a virtual image at the second conjugate position P2, which is conjugate to the external sensor 53 through the front windshield 21. In this way, the current brightness Bp of the outside view 8 is detected in a background portion 8a of the display image 56 (see FIG. 1, FIG. 4, and FIG. 5) formed at the first conjugate position P1 and produced at the second conjugate position P2, so that whether or not the fail condition F is met, which indicates a possible lack of contrast of the display image 56 relative to the outside view 8, can be determined precisely. Therefore, the display luminance of the images 56a selected as the display image 56 can be increased to as high as the fail-safe luminance Lfs, specifically in situations where the contrast may be insufficient because of the current brightness Bp of the outside view 8 exceeding the upper limit of the allowable range ΔB, so that the visibility of the selected images 56a can be ensured.

According to the first embodiment, when the fail condition F is met, the selected images 56a will hardly have insufficient contrast relative to the outside view 8 in the background portion 8a, because the display luminance is increased to the fail-safe luminance Lfs, with the display color forcibly adjusted to white color Cw. If the projector 51 is a liquid crystal projector, the optical energy delivered to the second conjugate position P2 can be secured by preventing a reduction in transmittance by means of the color filters of the liquid crystal panel, so that the selected images 56a can have a display luminance that provides a high contrast relative to the outside view 8. If the projector 51 is a laser scanner projector, the optical energy delivered to the second conjugate position P2 can be secured by reducing limitation on the output of the laser light source of each color, so that the selected images 56a can have a display luminance that provides a high contrast relative to the outside view 8. These enable improvement of the effect of ensuring the visibility of the selected images 56a.

Moreover, according to the first embodiment, when the fail condition F is met, the selected images 56a are reliably prevented from having insufficient contrast relative to the outside view 8 in the background portion 8a, because the display luminance is increased to the maximum level of the fail-safe luminance Lfs. This can guarantee the effect of ensuring the visibility of the selected images 56a.

Furthermore, according to the first embodiment, since the current brightness Bp of the outside view 8 is detected in the background portion 8a of the display image 56, whether or not the return condition R is met, whereby the lack of contrast is resolved, even if the luminance is the normal luminance Ln that is lower than the fail-safe luminance Lfs, can be determined precisely. Therefore, the display luminance of the selected images 56a can be returned to the normal luminance Ln, specifically in situations where the lack of contrast is resolved by the current brightness Bp of the outside view 8 falling back into the allowable range ΔB. Accordingly, situations where the contrast is too high because of the luminance being maintained at the high fail-safe luminance Lfs even after the current brightness Bp of the outside view 8 has fallen back into the allowable range ΔB, resulting in poor visibility of the selected images 56a, can be avoided.

In addition, in the first embodiment, when the current brightness Bp of the outside view 8 detected by the external sensor 53 reaches the intermediate brightness Bm that is within the allowable range ΔB after the fail condition F has been met, the return condition R is met. When this is the case, the display luminance of the selected images 56a is returned from the fail-safe luminance Lfs to the normal luminance Ln. In this way, hysteresis can be generated in the switching between the fail-safe luminance Lfs and the normal luminance Ln as shown in FIG. 7 when the current brightness Bp of the outside view 8 exceeds the upper limit of the allowable range ΔB and when the current brightness Bp of the outside view 8 falls back into the allowable range ΔB. Therefore, hunting, or rapid alternation between the fail-safe luminance Lfs and the normal luminance Ln of the display luminance of the selected images 56a, which will result in poorer visibility of the selected images 56a, can be avoided in situations where the current brightness Bp of the outside view 8 increases and decreases around the boundary between the inside and outside of the allowable range ΔB (i.e., around the minimum brightness Bth mentioned above). Accordingly, display luminance control of the selected images 56a can be executed with high robustness.

In addition, according to the first embodiment, in the display area A that contains the detection area 53a of the external sensor 53, the current brightness Bp of the outside view 8 is detected in the background portion 8a of the display image 56 produced and shown as a virtual image by the HUD 50. This can reliably improve the precision of determination of whether or not the fail condition F is met, which indicates lack of contrast, so that the effect of ensuring the visibility of the selected images 56a is guaranteed.

Second Embodiment

Figure 8:
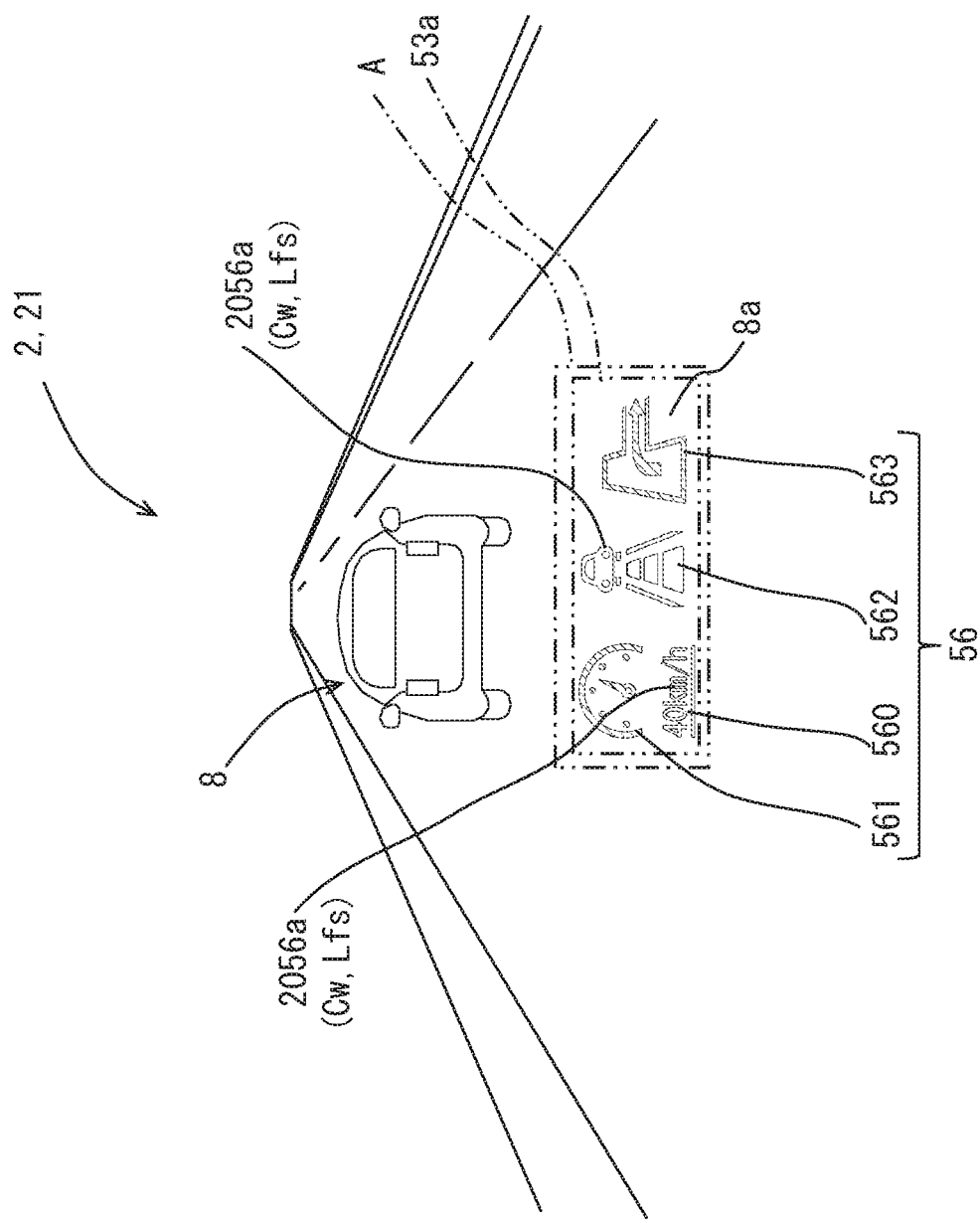
FIG. 8 is a front view showing how a display image is presented as a virtual image according to at least one embodiment.

The second embodiment of the present disclosure is a modification of the first embodiment. In the second embodiment, the selected images 2056a are selected in a different manner from that of the first embodiment, as shown in FIG. 8.

More specifically, at S105 of the display control flow according to the second embodiment, some of the images having high visibility priority are selected as selected images 2056a, from a vehicle speed image 560, an rpm image 561, an automatic control image 562, and a navigation image 563, which are at least included in the display image 56. In the example shown in FIG. 8, in particular, the vehicle speed image 560 and automatic control image 562 are selected as selected images 2056a that are prioritized in terms of visibility for an occupant. Therefore, at S106 of the display control flow according to the second embodiment, the display color and the display luminance of these vehicle speed image 560 and automatic control image 562 are adjusted to white color Cw and fail-safe luminance Lfs of the selected image 56a, respectively. At S103 and S109 of the display control flow according to the second embodiment, all of the vehicle speed image 560, rpm image 561, automatic control image 562, and navigation image 563 are selected as selected images 56a, similarly to the first embodiment.

According to the second embodiment, when the fail condition F is met, some parts 560 and 562 of the display image 56 having higher visibility priority are set as selected images 2056a. Therefore, the display luminance can be increased to the fail-safe luminance Lfs for ensuring visibility, specifically for the selected images 2056a having high visibility priority in particular, which are parts of the display image 56 having the outside view 8 in its background portion 8a, where the current brightness Bp exceeds the upper limit of the allowable range ΔB.

Third Embodiment

Figure 9:
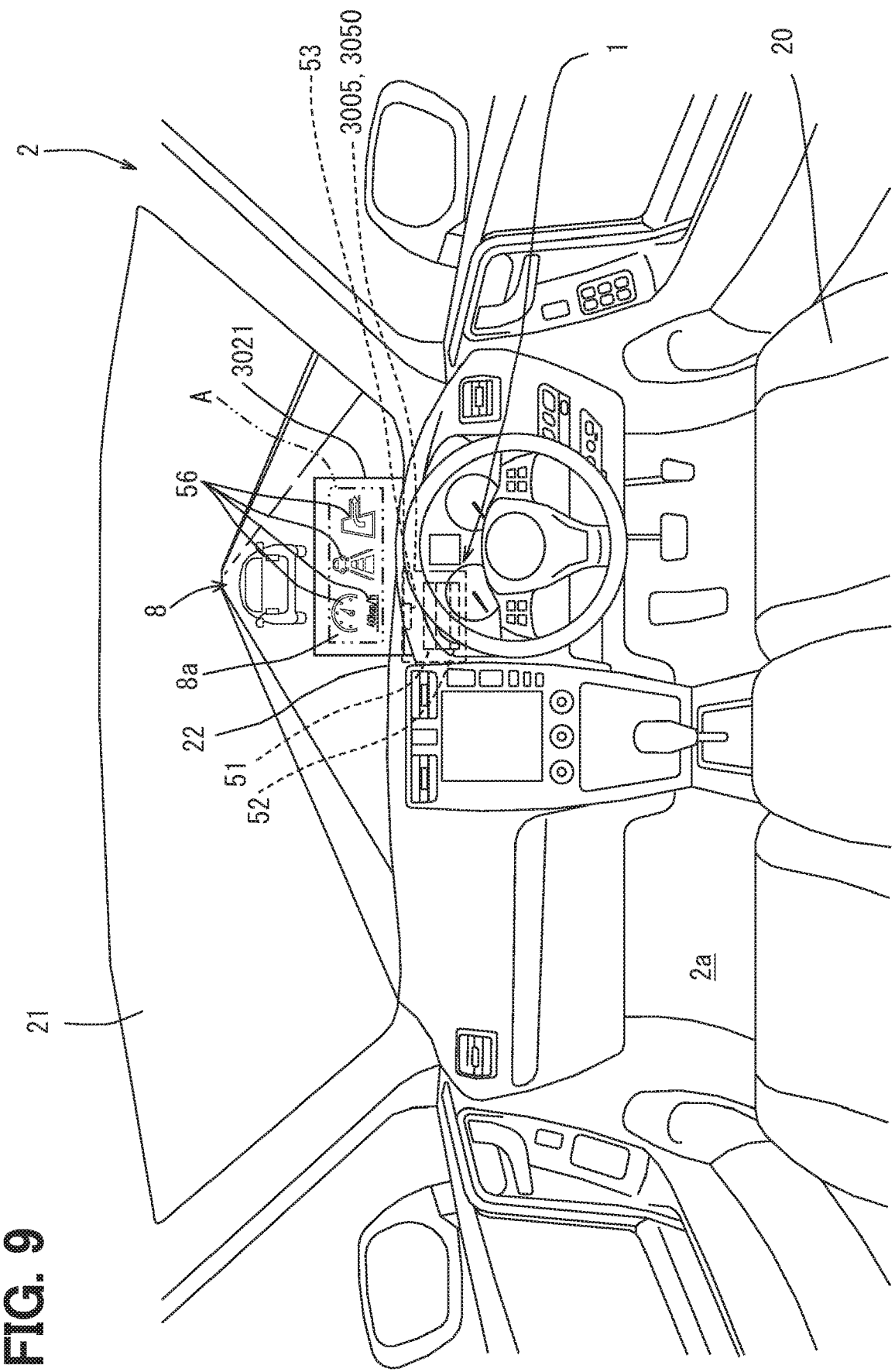
FIG. 9 is an internal view of the vehicle interior of a vehicle equipped with a vehicle display apparatus according to at least one embodiment.
Figure 10:
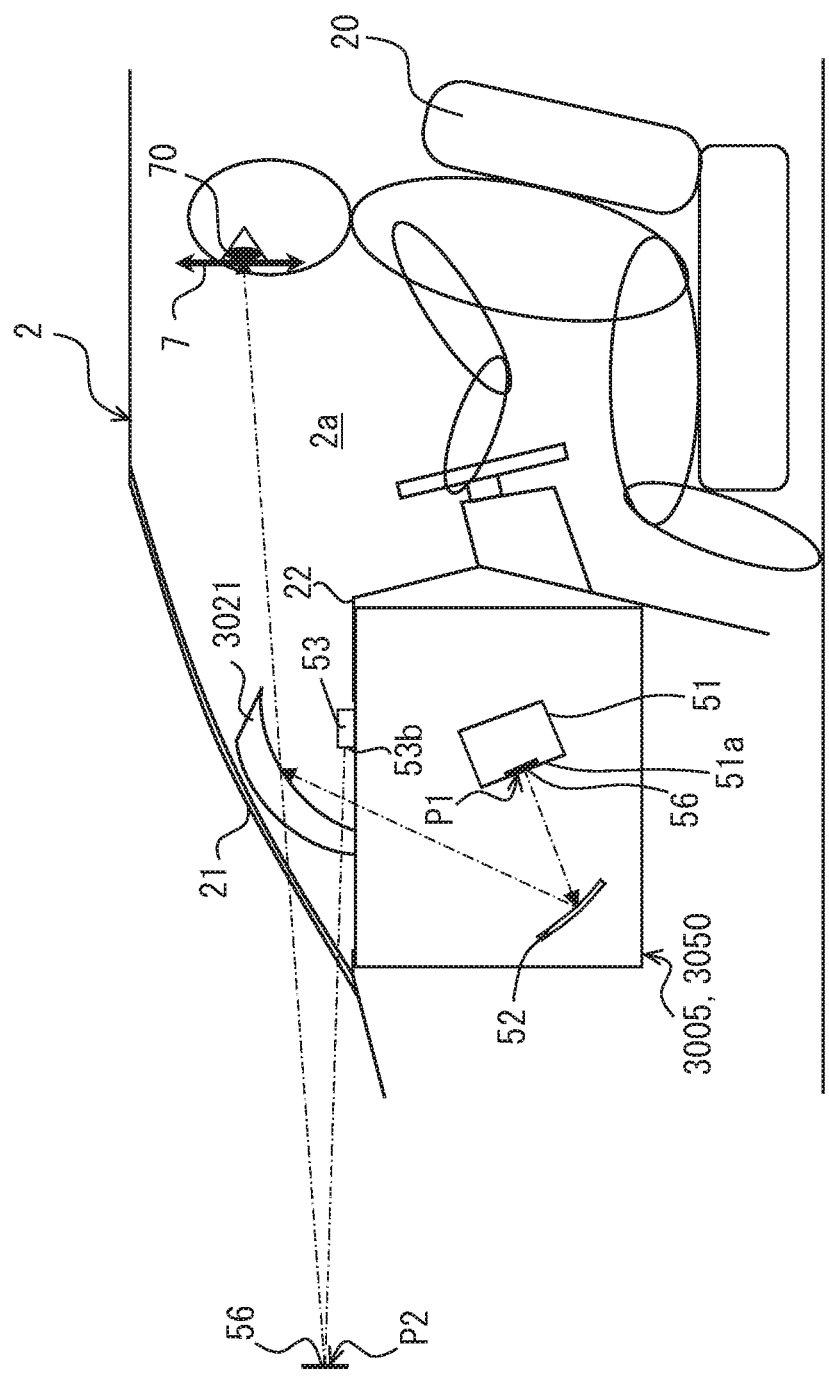
FIG. 10 is a block diagram showing the configuration of an HUD according to at least one embodiment.

The third embodiment of the present disclosure is a modification of the first embodiment. As shown in FIG. 9 and FIG. 10, an HUD 3050 of a vehicle display apparatus 3005 according to the third embodiment is mounted on the vehicle 2 with a combiner 3021. This combiner 3021 is disposed on the inner side of the front windshield 21 above the instrument panel 22 in the vehicle interior 2a. The combiner 3021 is made of transparent glass or resin, so that the outside view 8 shows through the front windshield 21 as well as the combiner. A display image 56 formed by the projector 51 of the HUD 3050 is projected on the combiner 3021. As a result, the light rays from the display image 56 reflected by the combiner 3021, and the light rays from the outside view 8 passing through the combiner 3021 are both perceived by an occupant on the driver's seat 20 in the vehicle interior 2a. Thus, the virtual image of the display image 56 produced in front of the combiner 3021 and the front windshield 21 is shown in a display area A overlapping with part of the outside view 8 as shown in FIG. 9, so that the occupant can see it in the viewing region 7 as shown in FIG. 10.

The image forming surface 51a of the projector 51 is disposed at a first conjugate position P1 which is conjugate to the viewing region 7 through the combiner 3021 that corresponds to the "projection member" in the third embodiment. The position where the display image 56 from the image forming surface 51a of the projector 51 is produced as a virtual image is set at a second conjugate position P2 which is conjugate to the detection surface 53b of the external sensor 53 through the front windshield 21 positioned frontward of the combiner 3021 that corresponds to the "projection member" in the third embodiment. Namely, the location where the display image 56 is conjugate to the detection surface 53b without through the combiner 3021 that corresponds to the "projection member" in the third embodiment. The display area A shown as a virtual image as a result of the display image 56 being produced at the second conjugate position P2 is adjusted such as to include the entire detection area 53a, which is the region where the external sensor 53 detects brightness, similarly to the first embodiment.

According to the third embodiment, the display image 56 formed at the first conjugate position P1, which is conjugate to the viewing region 7 through the combiner 3021 disposed on the inner side of the front windshield 21 in the vehicle interior 2a, is produced as a virtual image by the HUD 3050 at the second conjugate position P2 which is conjugate to the external sensor 53 through the front windshield 21. In this way, the current brightness Bp of the outside view 8 is detected in a background portion 8a of the display image 56 (see FIG. 9) formed at the first conjugate position P1 and produced at the second conjugate position P2, so that whether or not the fail condition F is met, which indicates a possible lack of contrast of the display image 56 relative to the outside view 8, can be determined precisely, similarly to the first embodiment. Therefore, the display luminance of the images 56a selected as the display image 56 can be increased to as high as the fail-safe luminance Lfs, specifically in situations where the contrast may be insufficient because of the current brightness Bp of the outside view 8 exceeding the upper limit of the allowable range ΔB, so that the visibility of the selected images 56a can be ensured.

Other Embodiments

While some embodiments of the present disclosure have been described above, the present disclosure should not be interpreted to be limited to these embodiments, and can be applied to various other embodiments and combinations thereof without departing from the scope of the subject matter of the present disclosure.

Figure 11:
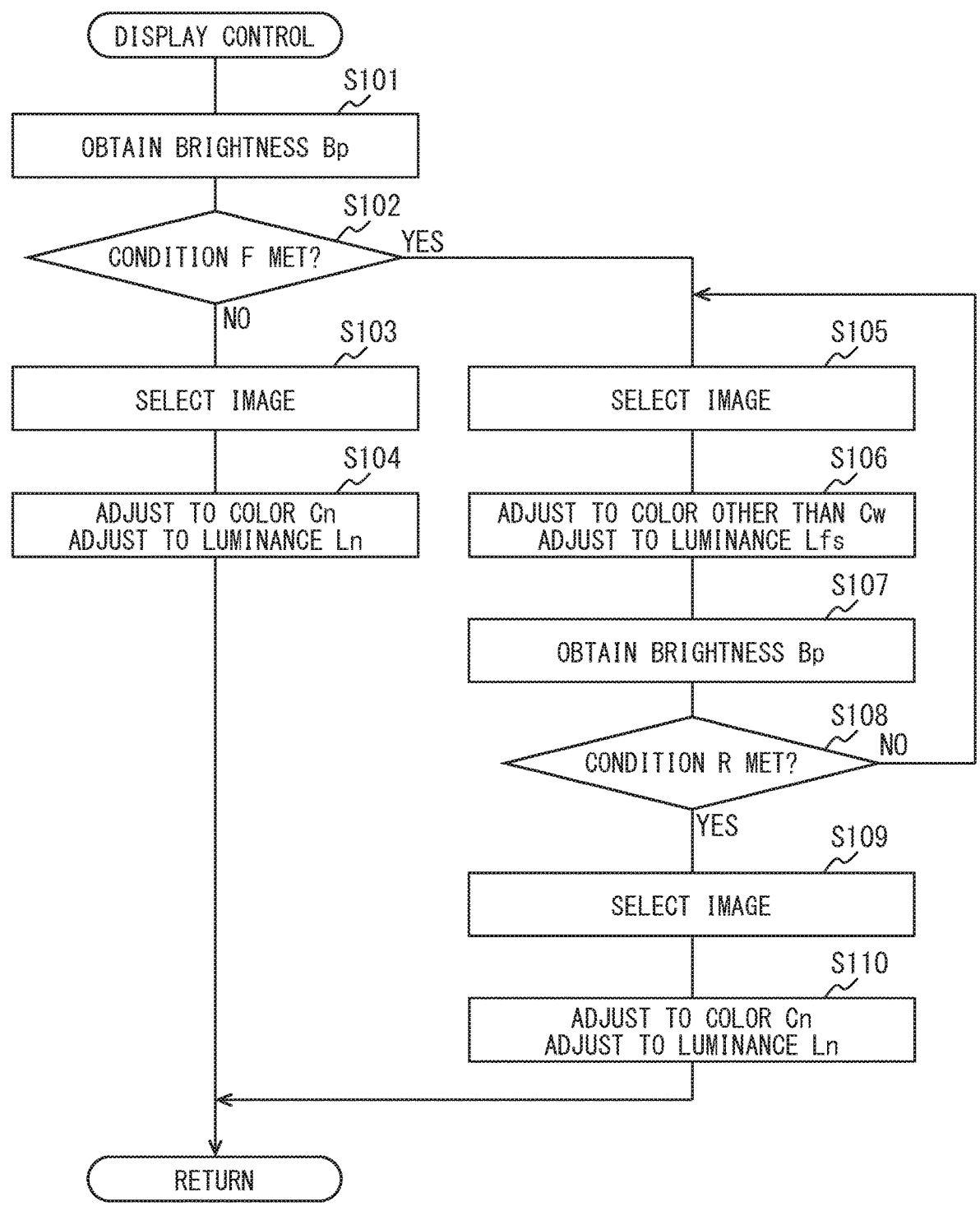
FIG. 11 is a flowchart showing a modification of the display control flow of FIG. 6.

In Modification 1 of the first to third embodiments, the display color may be adjusted to other colors than white color Cw that are different from or the same as the normal color Cn, as long as the display luminance is increased to the fail-safe luminance Lfs, at S106 of the display control flow as shown in FIG. 11. In Modification 2 of the first to third embodiments, the display luminance may be adjusted to a fail-safe luminance Lfs lower than the maximum luminance preset in HUD 50 or 3050 at S106 of the display control flow.

In Modification 3 of the first to third embodiments, the allowable range ΔB may be set to a range not greater than the minimum brightness Bth mentioned above at S101 of the display control flow. In such Modification 3, when the fail condition F is met, it means that the current brightness Bp exceeds the upper limit of the allowable range ΔB and exceeds the minimum brightness Bth.

Figure 12:
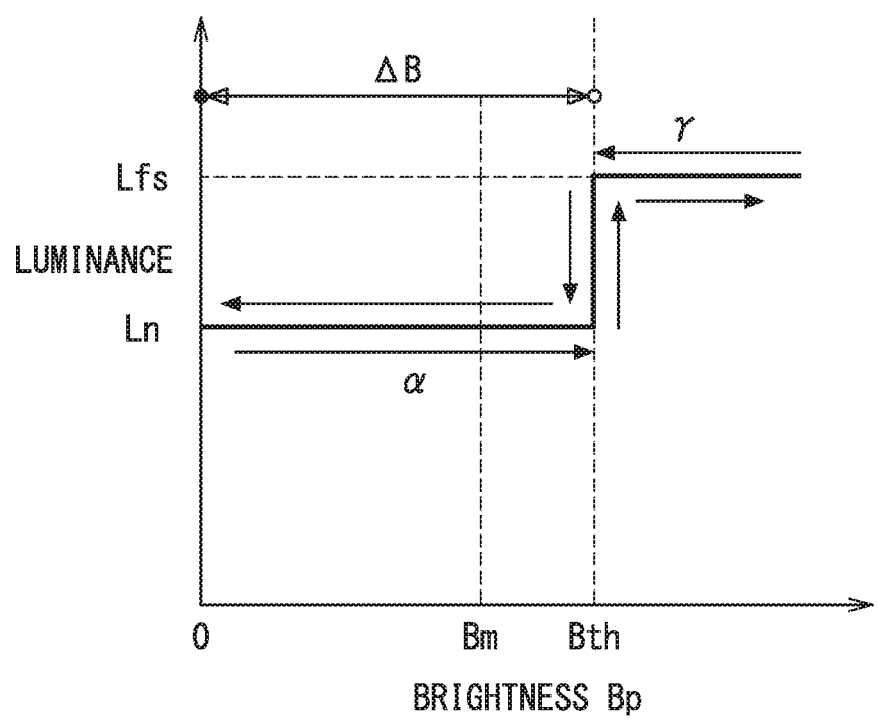
FIG. 12 is a graph for explaining a modification of the display control of FIG. 7.

In Modification 4 of the first to third embodiments, at S108 of the display control flow, it may be determined that the return condition R is met immediately when the current brightness Bp goes down to or below the minimum brightness Bth and falls back into the allowable range ΔB after the fail condition F has been met, as shown by arrow γ in FIG. 12. In Modification 5 of the first to third embodiments, at S108 of the display control flow, it may be determined that the return condition R is met even though the current brightness Bp has not fallen back into the allowable range ΔB, in which case a lapse of a prese time from the time when the fail condition F is met, for example, may be set as the return condition R.

In Modification 6 of the second embodiment, at S105 of the display control flow, different parts of the display image 56, other than the vehicle speed image 560 and automatic control image 562, may be selected as selected images 2056a. In Modification 7 of the third embodiment, at S105 of the display control flow, some parts of the display image 56 having high visibility priority may be selected as selected images 56a, similarly to the second embodiment.

In Modification 8 of the first to third embodiments, the display control flow may be started when one of various switches other than the power switch 41a is physically operated by the occupant. In Modification 9 of the first to third embodiments, the display control flow may be started when the HCU 54 or the vehicle control ECU 42 functionally permits it on the program (i.e., software) in accordance with the driving state (i.e., automatic control state or the like) of the vehicle 2. In Modification 10 of the first to third embodiments, at least some steps of the display control flow may be realized by hardware such as one or a plurality of ICs or the like instead of being functionally realized by the HCU 54.

Figure 13:
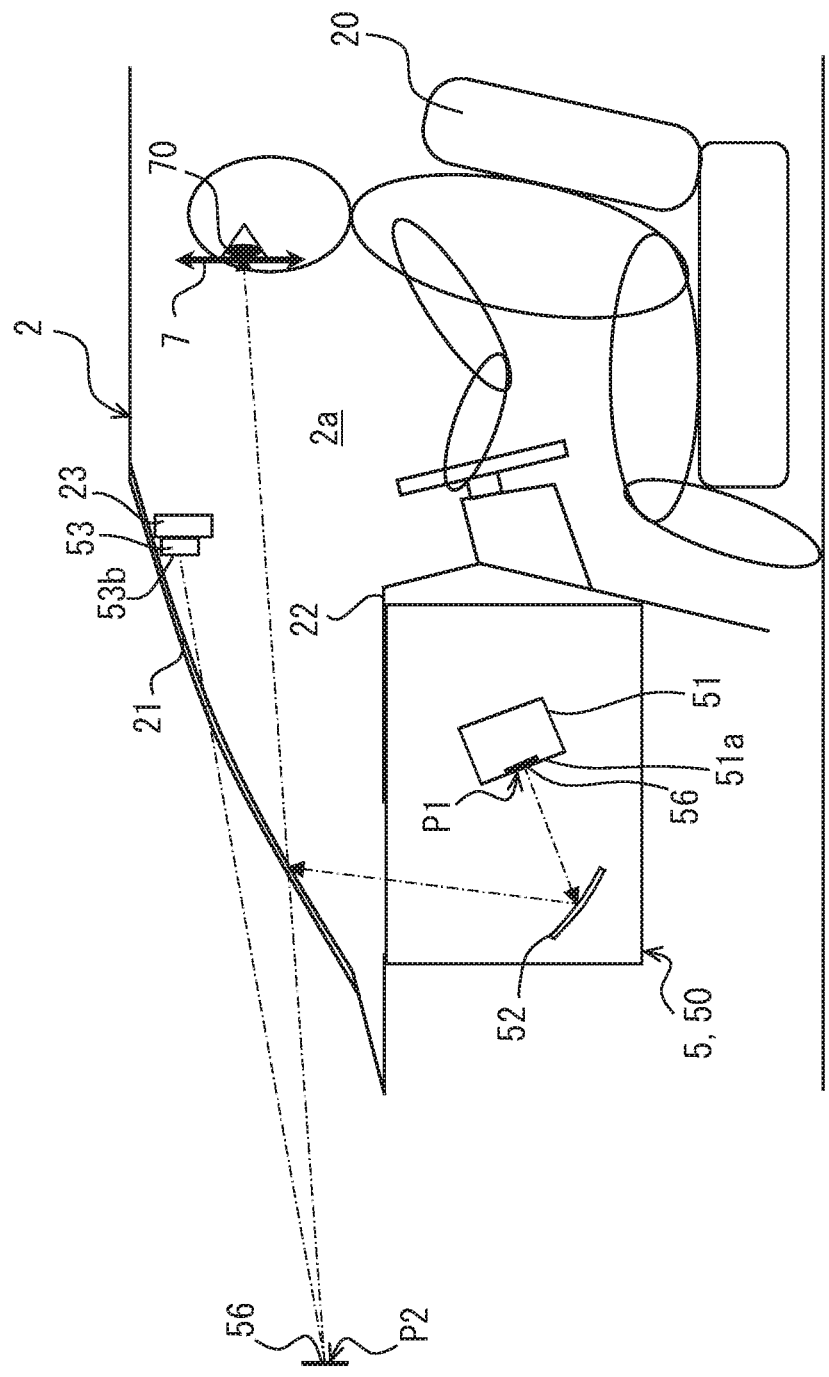
FIG. 13 is a block diagram showing a modification of the configuration of the HUD of FIG. 3.
Figure 14:
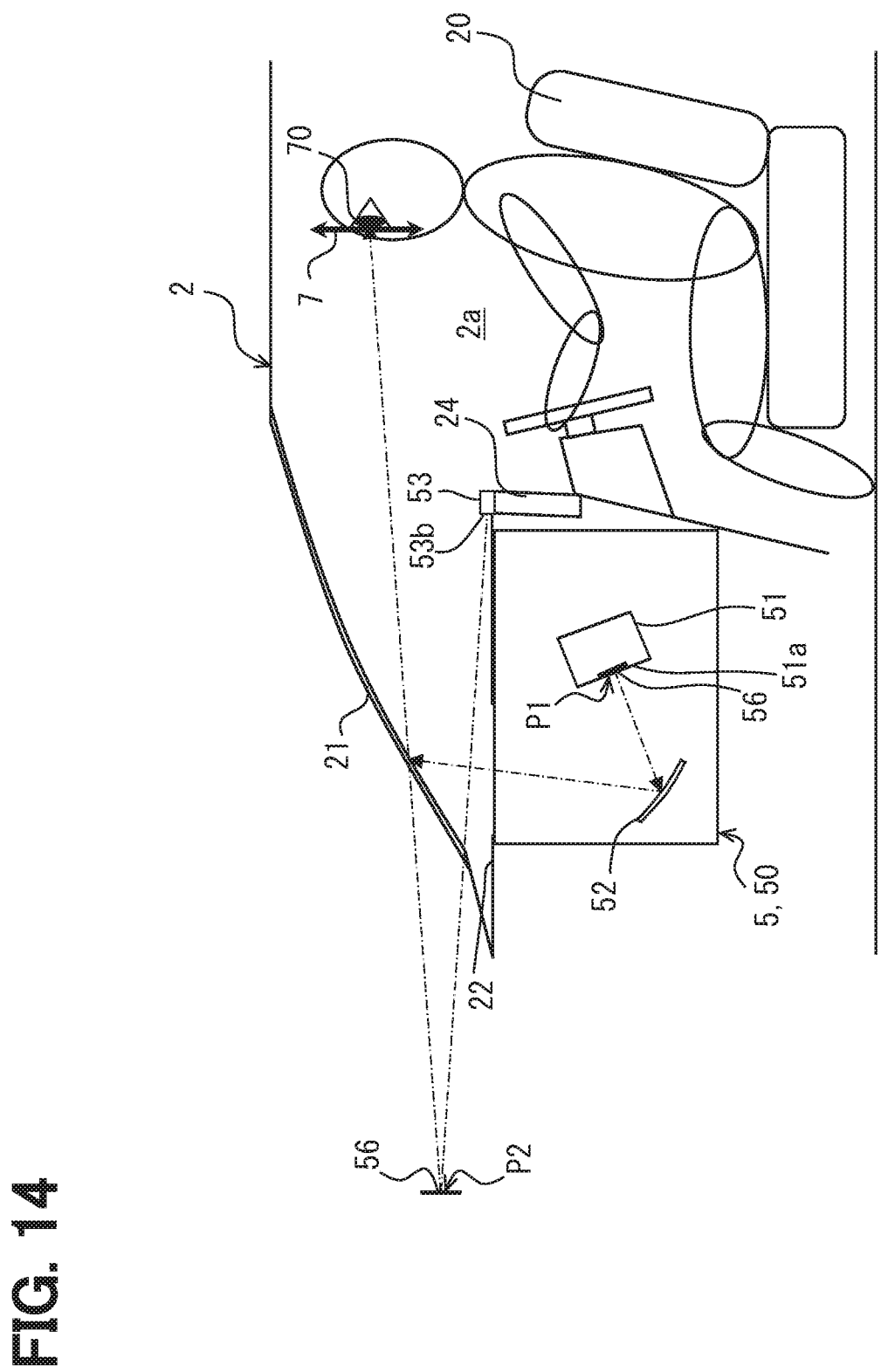
FIG. 14 is a block diagram showing a modification of the configuration of the HUD of FIG. 3.

In Modification 11 of the first to third embodiments, the external sensor 53 may be a product that is manufactured separately from the HUD 50 or 3050 and installed to one of the room mirror 23 shown in FIG. 13, for example, or the meter 24 shown in FIG. 14 or other onboard electric equipment in the vehicle interior 2a. In Modification 12 of the first to third embodiments, the surroundings sensor 30 or vehicle-related sensor 40 (e.g., communication device or the like) may be utilized as the "external sensor".

In Modification 13 of the first to third embodiments, the detection area 53a of the external sensor 53 may partly overlap with the display area A. Namely, in Modification 13, part of the detection area 53a may extend out of the display area A. In Modification 14 of the first to third embodiments, one or a plurality of the ECU that controls other display elements of the vehicle 2, and ECUs 31 and 42, may function as the "display control unit", in addition to or instead of the HCU 54.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle display apparatus displaying a display image as a virtual image visible from a viewing region inside a vehicle, the vehicle display apparatus comprising:
   an external sensor that detects brightness of an outside view of the vehicle;
   a projection member transparent to light from the outside view;
   a head-up display configured to project the display image formed at a first conjugate position to the projection member so as to place the virtual image at a second conjugate position, the first conjugate position being conjugate to the viewing region through the projection member, the second conjugate position being conjugate to the external sensor through the projection member; and
   a display control unit configured to increase display luminance of a selected image selected from the display image to a fail-safe luminance by controlling a virtual image display state of the display image when a fail condition is met, the fail condition being that the brightness detected by the external sensor exceeds an upper limit of an allowable range, wherein
   the display control unit reduces the display luminance of the selected image to a normal luminance that is lower than the fail-safe luminance when a return condition is met in a state where the fail condition has been met, the return condition being that the brightness detected by the external sensor reaches an intermediate brightness that is within the allowable range.

2. The vehicle display apparatus according to claim 1, wherein the display control unit forcibly adjusts a display color of the selected image to white color when the fail condition is met.

3. The vehicle display apparatus according to claim 1, wherein the display control unit increases the display luminance of the selected image to a highest level of the fail-safe luminance when the fail condition is met.

4. The vehicle display apparatus according to claim 1, wherein the display control unit sets a part of the display image having high visibility priority as the selected image when the fail condition is met.

5. The vehicle display apparatus according to claim 1, wherein a display area where the virtual image is placed by the head-up display contains a detection area of the external sensor.

6. A vehicle display apparatus displaying a display image as a virtual image visible from a viewing region inside a vehicle, the vehicle display apparatus comprising:
   an external sensor that detects brightness of an outside view of the vehicle;
   a projection member disposed on an inner side of a windshield of the vehicle and transparent to light from the outside view;
   a head-up display configured to project the display image formed at a first conjugate position to the projection member so as to place the virtual image at a second conjugate position, the first conjugate position being conjugate to the viewing region through the projection member, the second conjugate position being conjugate to the external sensor through the windshield; and
   a display control unit configured to increase display luminance of a selected image selected from the display image to a fail-safe luminance by controlling a virtual image display state of the display image when a fail condition is met, the fail condition being that the brightness detected by the external sensor exceeds an upper limit of an allowable range, wherein
   the display control unit reduces the display luminance of the selected image to a normal luminance that is lower than the fail-safe luminance when a return condition is met in a state where the fail condition has been met, the return condition being that the brightness detected by the external sensor reaches an intermediate brightness that is within the allowable range.

7. The vehicle display apparatus according to claim 6, wherein the display control unit forcibly adjusts a display color of the selected image to white color when the fail condition is met.

8. The vehicle display apparatus according to claim 6, wherein the display control unit increases the display luminance of the selected image to a highest level of the fail-safe luminance when the fail condition is met.

9. The vehicle display apparatus according to claim 6, wherein the display control unit sets a part of the display image having high visibility priority as the selected image when the fail condition is met.

10. The vehicle display apparatus according to claim 6, wherein a display area where the virtual image is placed by the head-up display contains a detection area of the external sensor.

* * * * *